United States Patent
Huang et al.

(10) Patent No.: US 12,365,056 B2
(45) Date of Patent: Jul. 22, 2025

(54) MANUFACTURING METHOD FOR ADDITIVE MANUFACTURED ARTICLE AND ADDITIVE MANUFACTURED ARTICLE

(71) Applicant: KOBE STEEL, LTD., Hyogo (JP)

(72) Inventors: Shuo Huang, Hyogo (JP); Shinji Sato, Hyogo (JP); Masatoshi Hida, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 737 days.

(21) Appl. No.: 17/611,092

(22) PCT Filed: Apr. 24, 2020

(86) PCT No.: PCT/JP2020/017767
§ 371 (c)(1),
(2) Date: Nov. 12, 2021

(87) PCT Pub. No.: WO2020/230592
PCT Pub. Date: Nov. 19, 2020

(65) Prior Publication Data
US 2022/0226943 A1    Jul. 21, 2022

(30) Foreign Application Priority Data
May 14, 2019    (JP) .................................. 2019-091596

(51) Int. Cl.
*B23K 37/06*    (2006.01)
*B22F 10/28*    (2021.01)
(Continued)

(52) U.S. Cl.
CPC .............. *B23K 37/06* (2013.01); *B22F 10/28* (2021.01); *B33Y 10/00* (2014.12); *B33Y 80/00* (2014.12)

(58) Field of Classification Search
CPC .... B23K 37/06; B23K 10/027; B23K 26/342; B23K 9/044; B23K 9/16; B23K 9/167;
(Continued)

(56) References Cited

U.S. PATENT DOCUMENTS

2019/0315049 A1    10/2019    Nakano
2022/0032535 A1    2/2022    Hikmet et al.

FOREIGN PATENT DOCUMENTS

| CN | 112888550 A | 6/2021 |
| JP | 2003-266174 A | 9/2003 |
| WO | 2019/053792 A1 | 3/2019 |

OTHER PUBLICATIONS

International Search Report issued in PCT/JP2020/017767; mailed Jun. 30, 2020.

(Continued)

*Primary Examiner* — Moshe Wilensky
(74) *Attorney, Agent, or Firm* — Studebaker Brackett PLLC

(57) ABSTRACT

A method for manufacturing an additively-manufactured object, in which a plurality of weld beads obtained by melting and solidifying a filler metal are deposited on a base portion to build a built-up object, includes: a support bead forming step of forming a support bead on the base portion; and a depositing step of depositing a weld bead on the support bead. When the support bead is formed to be inclined from a vertical direction in the support bead forming step, a ratio H/W of a height H to a width W of the support bead is set to 0.35 or more.

2 Claims, 14 Drawing Sheets

(51) Int. Cl.
*B33Y 10/00* (2015.01)
*B33Y 80/00* (2015.01)

(58) Field of Classification Search
CPC ........ B23K 9/173; B23K 9/291; B23K 9/295; B23K 9/296; B22F 10/28; B22F 10/40; B22F 10/47; B22F 10/25; B22F 5/10; B33Y 10/00; B33Y 80/00
See application file for complete search history.

(56) References Cited

OTHER PUBLICATIONS

Written Opinion issued in PCT/JP2020/017767; mailed Jun. 30, 2020.
Panchagnula Jayaprakash Sharma et al.; "Feature based Weld-Deposition for Additive Manufacturing of Complex Shapes"; Journal of the Institution of Engineers (India) Series C; Aug. 30, 2016; pp. 285-292; vol. 99, No. 3; Springer India, India.
Wu Qianru et al.; "Obtaining fine microstructure and unsupported overhangs by low heat input pulse arc additive manufacturing"; Journal of Manufacturing Processes; Society of Manufacturing Engineers; Dearborn, MI, US; May 15, 2017; pp. 198-206; vol. 27.
Xiong Jun et al.; "Fabrication of inclined thin-walled parts in multi-layer single-pass GMAW-based additive manufacturing with flat position deposition"; Journal of Materials Processing Technology; Oct. 22, 2016; pp. 397-403; vol. 240; Elsevier, NL.
The extended European search report issued by the European Patent Office on May 10, 2022, which corresponds to European Patent Application No. 20805252.2-1103 and is related to U.S. Appl. No. 17/611,092.

MANUFACTURING METHOD FOR ADDITIVE MANUFACTURED ARTICLE AND ADDITIVE MANUFACTURED ARTICLE

TECHNICAL FIELD

The present invention relates to a method for manufacturing an additively-manufactured object and an additively-manufactured object.

BACKGROUND ART

In recent years, needs for 3D printers as a means of manufacturing have been increasing, and research and development have been carried out for practical use in the aircraft industry and the like, especially for application to metal materials. A 3D printer using a metal material melts a metal powder or a metal wire by using a heat source such as a laser or an arc, and deposits the molten metal to build a built-up object.

As a technique for building such an additively-manufactured object, there is known a technique for manufacturing a three-dimensional shaped object by performing scanning with a torch along a horizontal plane or an inclined surface to advance surfacing in a torch scanning step (see, for example, Patent Literature 1).

CITATION LIST

Patent Literature

Patent Literature 1: JP-A-2003-266174

SUMMARY OF INVENTION

Technical Problem

In a case where a weld bead is formed on a substrate or a base portion of a lower weld bead, when the base portion is a vertical surface or an inclined surface, dripping due to the influence of gravity may occur. In addition, when a moving speed of the welding torch is increased in order not to drip the weld bead, humping which interrupts the weld bead may occur. Therefore, there is a demand for a technique for smoothly forming a weld bead to manufacture a built-up object without being influenced by the state of the base portion on which the weld bead is formed and without any problems such as dripping or humping.

The present invention has been made in view of the above circumstances, and an object of the present invention is to provide a method for manufacturing an additively-manufactured object by which a weld bead is efficiently formed to build an additively-manufactured object without any problems such as dripping or humping, and an additively-manufactured object.

Solution to Problem

The present invention has the following configurations.

(1) A method for manufacturing an additively-manufactured object, in which a plurality of weld beads obtained by melting and solidifying a filler metal are deposited on a base portion to build a built-up object, the method including:

a support bead forming step of forming a support bead on the base portion; and a depositing step of depositing a weld bead on the support bead, in which, when the support bead is formed to be inclined from a vertical direction in the support bead forming step, a ratio H/W of a height H to a width W of the support bead is set to 0.35 or more.

(2) An additively-manufactured object formed by depositing, on a base portion, a plurality of weld beads obtained by melting and solidifying a filler metal, the additively-manufactured object including:

a support bead formed on the base portion; and a weld bead deposited on the support bead, in which the support bead has a ratio H/W of a height H to a width W of an overhang-shaped portion having an overhang of 0.35 or more.

Advantageous Effects of Invention

According to the present invention, it is possible to efficiently form a weld bead to build an additively-manufactured object without any problems such as dripping or humping.

DESCRIPTION OF EMBODIMENTS

Hereinafter, embodiments of the present invention will be described in detail with reference to the drawings.

Figure 1:
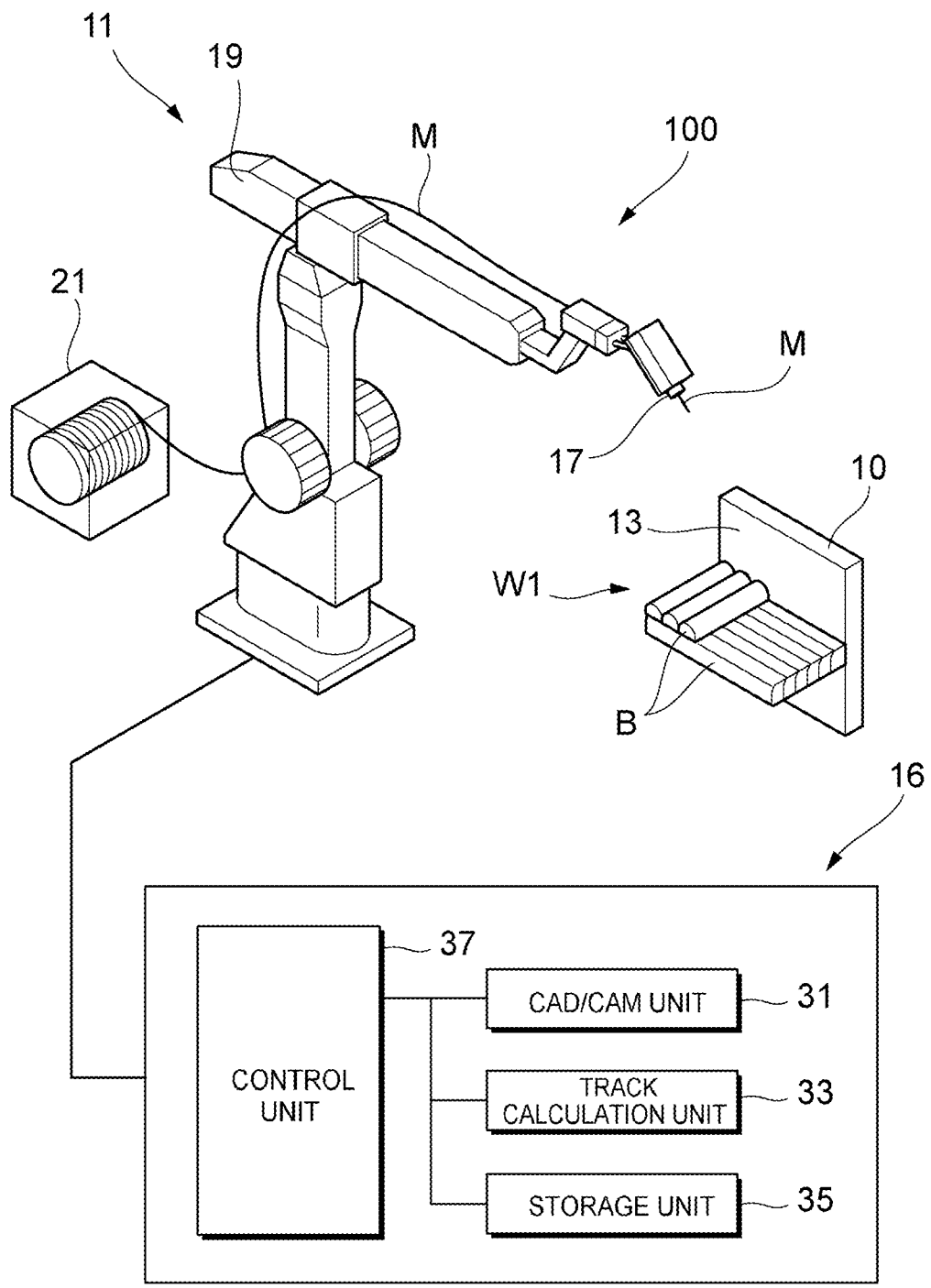
FIG. 1 is a configuration diagram of a manufacturing system for manufacturing an additively-manufactured object.

FIG. 1 is a schematic configuration diagram of a manufacturing system for manufacturing an additively-manufactured object according to the present invention.

A manufacturing system 100 having this configuration includes a depositing-building device 11 and a controller 16 that controls the depositing-building device 11 in an integrated manner.

The depositing-building device 11 includes a welding robot 19 having a torch 17 on a tip shaft, and a filler metal feeding unit 21 for feeding a filler metal (weld wire) M to the torch 17.

The controller 16 includes a CAD/CAM unit 31, a track calculation unit 33, a storage unit 35, and a control unit 37 connected to the above units.

The welding robot 19 is an articulated robot, and the torch 17 provided on the tip shaft is supported such that the filler metal M can be continuously fed. The position or posture of the torch 17 can be set three-dimensionally desirably within the range of the degree of freedom of the robot arm.

The torch 17 includes a not-shown shield nozzle, and shielding gas is supplied from the shield nozzle. The arc welding method used in this configuration may be either a consumable electrode type such as shielded metal arc welding or carbon dioxide gas arc welding, or a non-consumable electrode type such as TIG welding or plasma arc welding. The arc welding method is appropriately selected depending on an additively-manufactured object to be manufactured.

For example, in the case of the consumable electrode type, a contact tip is disposed inside the shield nozzle, and the filler metal M to which a melting current is to be supplied is held on the contact tip. The torch 17 generates an arc from the tip of the filler metal M in a shielding gas atmosphere while holding the filler metal M. The filler metal M is fed from the filler metal feeding unit 21 to the torch 17 by a not-shown delivery mechanism attached to the robot arm or the likes. Then, when the filler metal M continuously fed is melted and solidified while moving the torch 17, a linear weld bead B, which is a melt-solidified body of the filler metal M, is formed on a base plate 10.

A heat source for melting the filler metal M is not limited to the aforementioned arc. The heat source using another system such as a heating system using an arc and a laser together, a heating system using plasma, or a heating system using an electron beam or a laser may be used. In the case of heating by an electron beam or a laser, a heating amount can be controlled more finely to keep the weld bead in a more proper state, thereby contributing to further improvement of the quality of the additively-manufactured object.

The CAD/CAM unit 31 creates shape data of the additively-manufactured object to be manufactured, and then divides the additively-manufactured object into a plurality of layers to generate layer shape data representing the shape of each layer. The track calculation unit 33 obtains a movement track of the torch 17 based on the generated layer shape data. The storage unit 35 stores data such as the generated layer shape data and the movement track of the torch 17.

The control unit 37 drives the welding robot 19 by executing a drive program based on the layer shape data or the movement track of the torch 17 stored in the storage unit 35.

The control unit 37 drives the welding robot 19 by executing a drive program based on the layer shape data or the movement track of the torch 17 stored in the storage unit 35. That is, the welding robot 19 moves the torch 17 while melting the filler metal M with an arc based on the movement track of the torch 17 generated by the track calculation unit 33 in response to a command from the controller 16. FIG. 1 shows a state where a plurality of weld beads B are deposited on the vertically installed base plate 10 made of a steel plate to build an additively-manufactured object W1.

The manufacturing system 100 having the above configuration melts the filler metal M while moving the torch 17 by driving the welding robot 19 along the movement track of the torch 17 generated based on the set layer shape data, and supplies the molten filler metal M onto the base plate 10. Accordingly, for example, the additively-manufactured object W1 in which a plurality of linear weld beads B are deposited in a horizontal direction on a base portion 13 of the vertically installed base plate 10 is built.

When the weld bead B is deposited on a base portion having a vertical surface or an inclined surface inclined from a vertical direction to build the additively-manufactured object W1 having an overhang-shaped portion, the weld bead B to be deposited may drip due to the influence of gravity. In such a case where the weld bead B to be formed is greatly influenced by gravity, dripping may be prevented by increasing the moving speed of the torch 17, but there is a possibility that the weld bead B may be interrupted and humping occurs.

Therefore, in the present embodiment, the additively-manufactured object W1 is built while preventing dripping and humping in the weld bead B as follows. Here, a case where the weld bead B is formed in the horizontal track direction on the base portion 13 of the base plate 10, which is a vertical surface, to build the additively-manufactured object W1 will be described.

FIG. 2A to FIG. 2D are schematic side views of the additively-manufactured object being manufactured, which show a procedure for manufacturing the additively-manufactured object.

Support Bead Forming Step

Figure 2A:
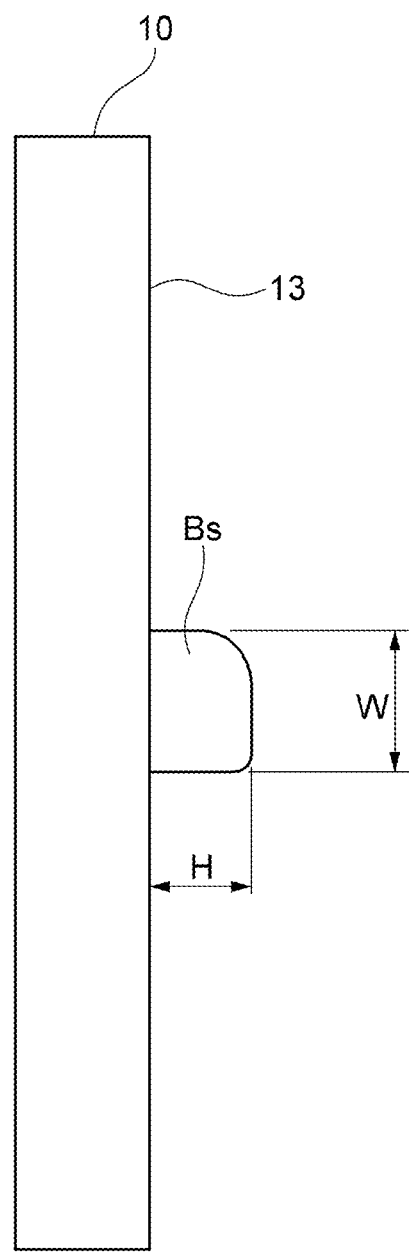
FIG. 2A is a schematic side view of the additively-manufactured object being manufactured, which shows a procedure for manufacturing the additively-manufactured object.

As shown in FIG. 2A, a support bead Bs made of the weld bead B is formed on the base portion 13 of the base plate 10 whose surface is a vertical surface. Specifically, the tip of the torch 1 with the filler metal M protruded therefrom is disposed toward the base portion 13 of the base plate 10, and the torch 17 is moved in the horizontal direction, which is a track direction, while melting the filler metal M with an arc. Accordingly, the support bead Bs is formed along the horizontal direction on the base portion 13 having a vertical surface. At this time, the support bead Bs to be formed is formed such that a ratio of a height H to a width W is 0.35 or more (H/W≥0.35).

Here, a state of the support bead Bs formed on the base portion 13 will be described.

Figure 3:
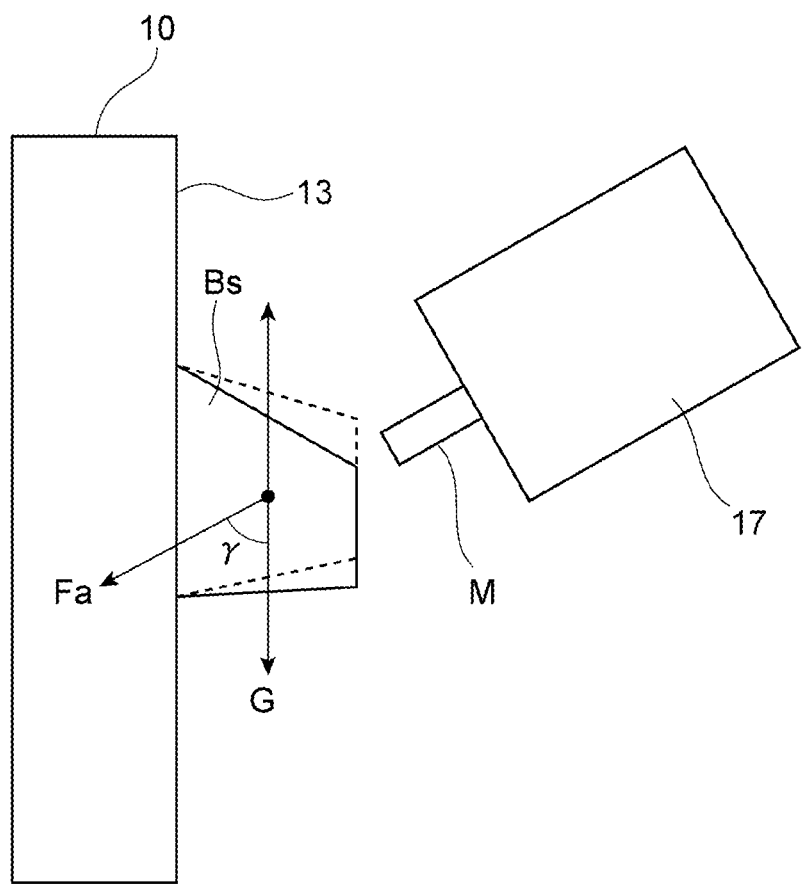
FIG. 3 is a schematic side view showing a state of a support bead formed on a base portion.

FIG. 3 is a schematic side view showing a state of the support bead formed on the base portion.

As shown in FIG. 3, when the support bead Bs is formed along the horizontal direction with respect to the base portion 13 having a vertical surface, gravity G acts on this support bead Bs. In addition, due to an inclination angle γ of the torch 17 with respect to the vertical direction, a downward component force Fa·cos γ at an arc pressure Fa acts downward in the vertical direction. Then, a surface tension Fst, which is an apparent viscous force of the support bead Bs to be formed, is given by the following equation (1).

$$Fst = G + Fa \cdot \cos \gamma \quad (1)$$

In a case where the weld bead B is formed on the base portion 13, when a current value of the arc increases, the entire arc pressure Fa increases, and accordingly the weld bead B becomes to have a flat shape. Moreover, when the current value of the arc increases, the downward component force Fa·cos γ at the arc pressure Fa increases, and the weld bead tends to drip. In addition, even when the inclination angle γ of the torch 17 with respect to the vertical direction is small, the downward component force Fa·cos y at the arc pressure Fa increases, and the weld bead tends to drip. Further, when an amount of welding to the base portion 13 increases, the influence of the gravity G increases, and the weld bead B tends to drip.

In this example, for example, when forming the support bead Bs, the current value of the arc, a voltage value of the arc, the moving speed of the torch 17, the angle of the torch 17, and the like are adjusted. Accordingly, the support bead Bs is formed such that a ratio of a height H to a width W is 0.35 or more (H/W≥0.35). Then, the support bead Bs to be formed on the base portion 13 is formed on the base portion 13 without dripping due to the influence of the gravity G. Here, the support bead Bs is formed in the horizontal direction, but the support bead Bs is not necessarily formed horizontally, and may be formed to be inclined from the vertical direction.

Support Layer Building Step

Figure 2B:
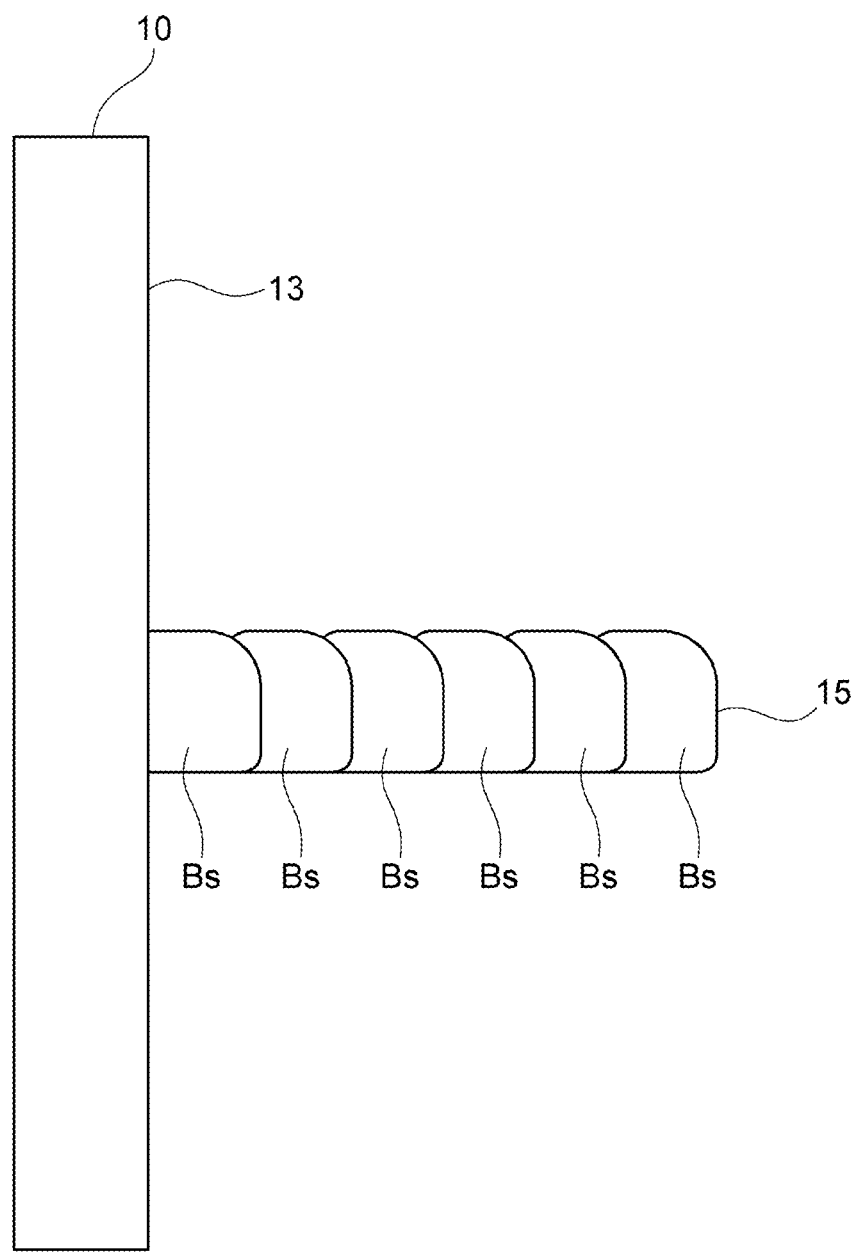
FIG. 2B is a schematic side view of the additively-manufactured object being manufactured, which shows the procedure for manufacturing the additively-manufactured object.

As shown in FIG. 2B, a plurality of support beads Bs are sequentially deposited on a side of the support bead Bs that has been formed on the base portion 13. Accordingly, a support layer 15 in which a plurality of support beads Bs are deposited is built from the base portion 13 toward the side.

At this time, each of the support beads Bs is formed such that the ratio of the height H to the width W is also 0.35 or more (H/W≥0.35). Then, the support beads Bs that have been sequentially deposited are formed without dripping due to the influence of the gravity G.

Depositing Step

Figure 2C:
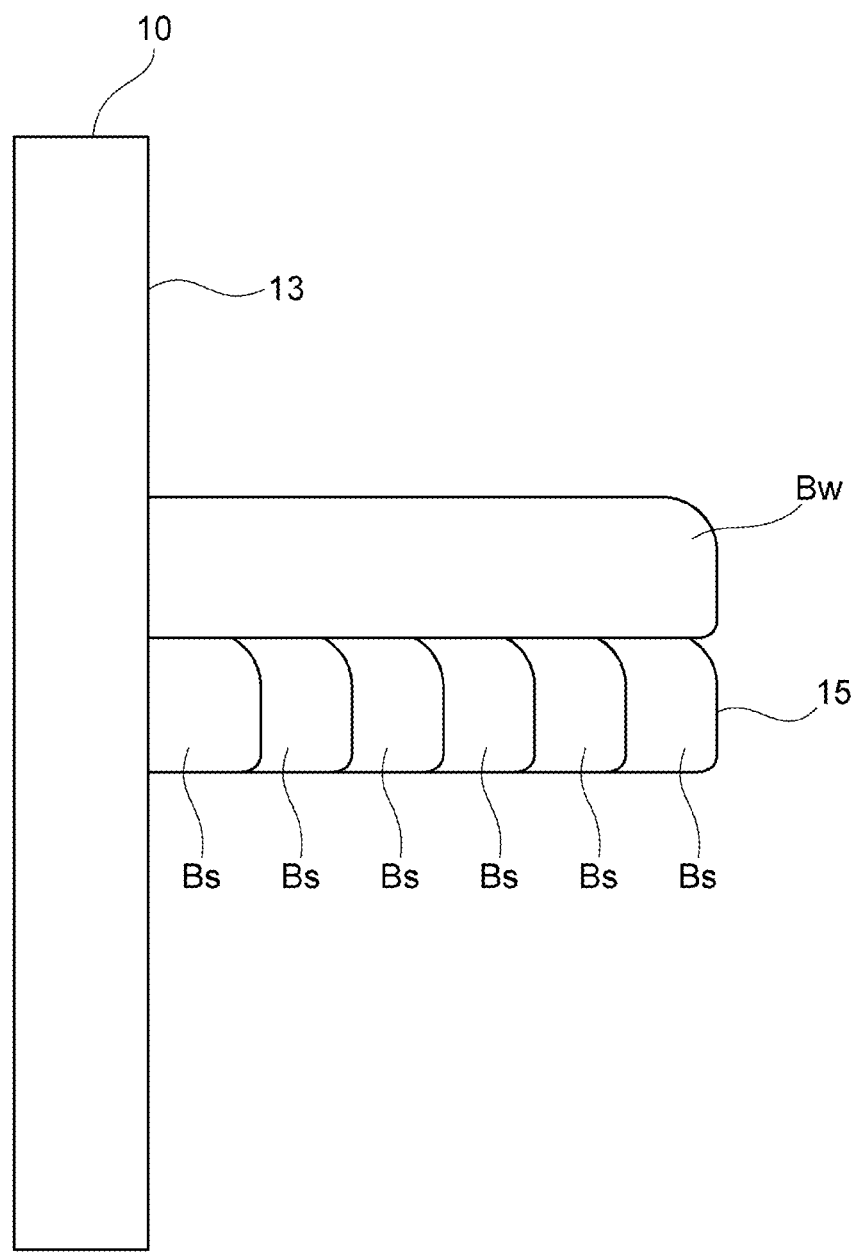
FIG. 2C is a schematic side view of the additively-manufactured object being manufactured, which shows the procedure for manufacturing the additively-manufactured object.
Figure 2D:
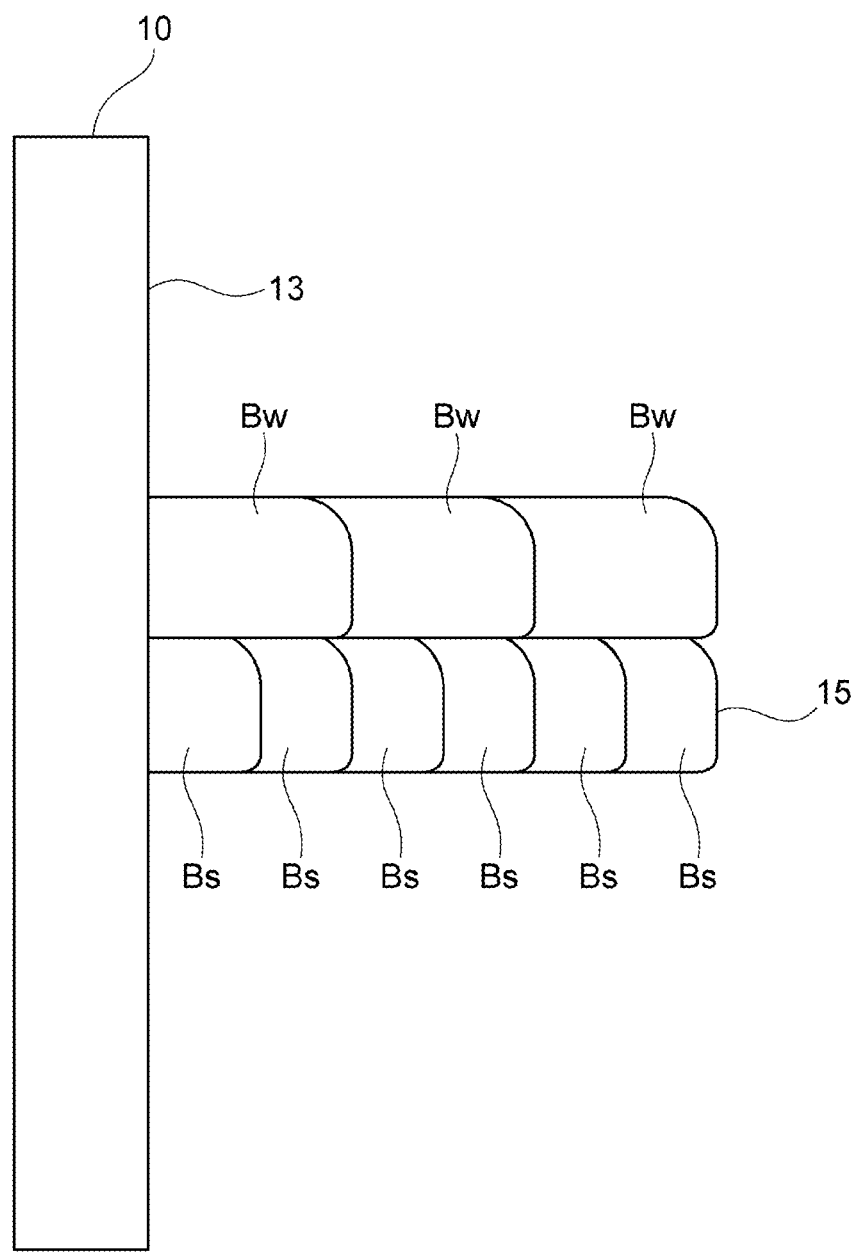
FIG. 2D is a schematic side view of the additively-manufactured object being manufactured, which shows the procedure for manufacturing the additively-manufactured object.

As shown in FIG. 2C, a weld bead Bw wider than the support bead Bs is formed on the support layer 15 formed with the support beads Bs. The wide weld bead Bw is formed along a deposition direction orthogonal to a forming direction of the support beads Bs forming the support layer 15. At this time, since the weld bead Bw is formed on the support layer 15, the weld bead Bw is smoothly formed without dripping due to the influence of the gravity G. Accordingly, a wide weld bead Bw can be formed to reduce a formation pass after building the support layer 15, and the manufacturing efficiency can be improved. As shown in FIG. 2D, the weld bead Bw may be formed in the same direction as the forming direction of the support beads Bs.

Thus, according to the method for manufacturing an additively-manufactured object and the additively-manufactured object of the present embodiment, the ratio of the height H to the width W of the support bead Bs is set to 0.35 or more when forming the support bead Bs on the base portion 13. Accordingly, the support bead Bs can be formed without dripping with respect to the base portion 13 by preventing the influence of the gravity G. Therefore, the weld bead Bw deposited on this support bead Bs can be prevented from dripping under the influence of the gravity G, and the occurrence of humping that may occur when increasing the moving speed of the torch 17 to prevent dripping can be prevented. Accordingly, the additively-manufactured object W1 having an overhang-shaped portion protruding from the base portion 13 to the side can be manufactured with high quality while reducing a takt time.

In addition, the support bead Bs is deposited from the base portion 13 toward the side to form the support layer 15, and the wide weld bead Bw is formed on the support layer 15 to form the additively-manufactured object W1. That is, the support layer 15 is built with the support bead Bs formed without dripping, and the weld bead Bw wider than the support bead Bs is deposited on the support layer 15. Therefore, the wide weld bead Bw to be formed on the support layer 15 can be smoothly formed and deposited without dripping due to the influence of the gravity G. Accordingly, the wide weld bead Bw can be formed to reduce the formation pass after building the support layer 15, and the manufacturing efficiency can be improved.

The support layer 15 formed by depositing the support bead Bs from the base portion 13 to the side is formed without dripping. Therefore, for example, by forming a part of a wall such as a ceiling of a cavity portion that serves as a flow path or the like, the additively-manufactured object W1 having a cavity portion having a stable shape can be obtained.

Next, examples of manufacturing the additively-manufactured object by the manufacturing method according to the above embodiment will be described.

FIG. 4A to FIG. 4D are perspective views of the additively-manufactured object being manufactured, which show an example of the procedure for manufacturing the additively-manufactured object.

Figure 4A:
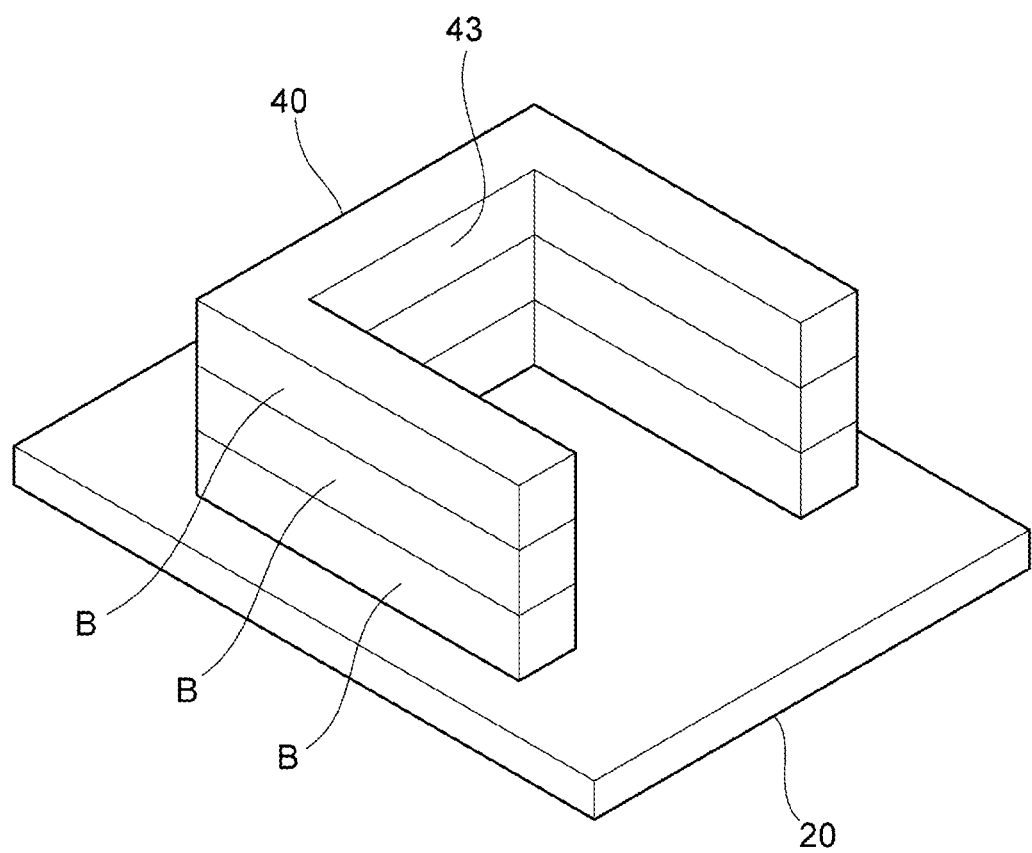
FIG. 4A is a perspective view of the additively-manufactured object being manufactured, which shows an example of the procedure for manufacturing the additively-manufactured object.

As shown in FIG. 4A, first, the weld bead B is deposited on a plate-shaped base metal 20, and a bent wall portion (outer frame portion) 40 is formed by depositing the weld bead B while changing a stretching direction. In this example, an example of building the wall portion 40 having a substantially C-shape in a plan view is shown. Alternatively, the weld bead B may have a curved wall portion extending along an arc, a curve, or the like having a curvature such as a substantially U-shape or an O-shape in the plan view.

Figure 4B:
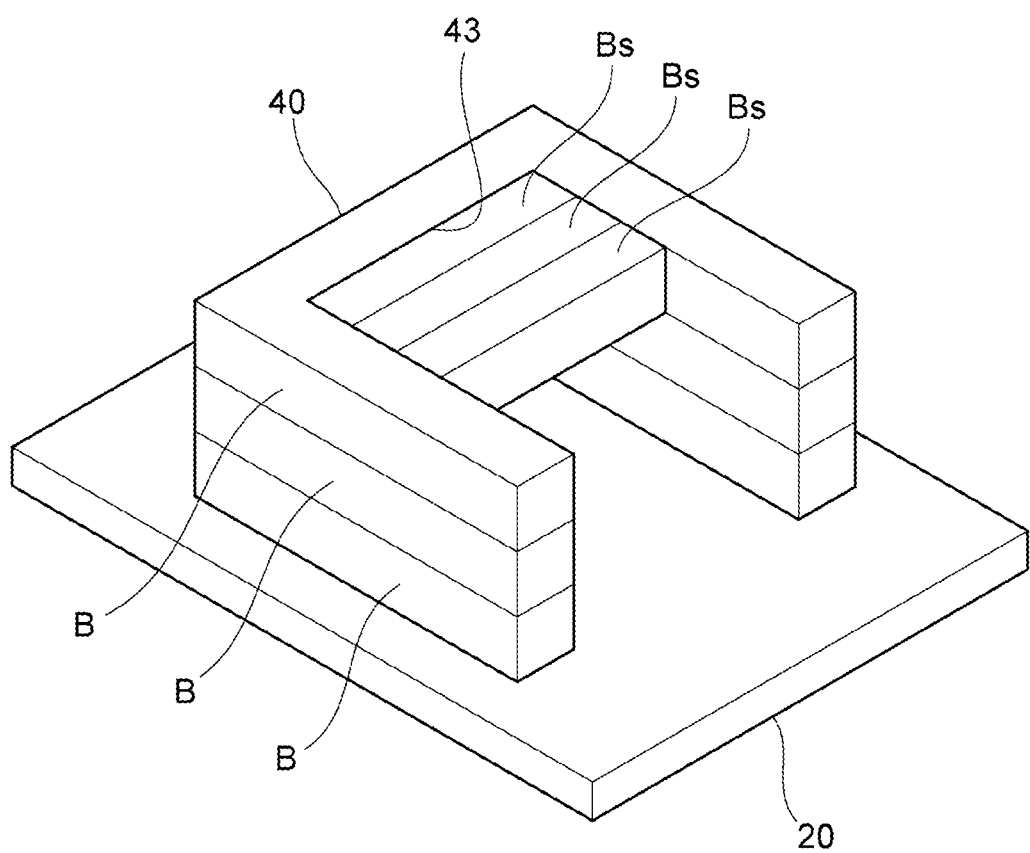
FIG. 4B is a perspective view of the additively-manufactured object being manufactured, which shows the example of the procedure for manufacturing the additively-manufactured object.

Next, as shown in FIG. 4B, a part of an inner surface side of the wall portion 40 is used as a base portion 43, and the support bead Bs is formed on an upper edge portion of the base portion 43 (support bead forming step). At this time, the support bead Bs to be formed is formed such that the ratio of the height H to the width W is 0.35 or more (H/W≥0.35) (see FIG. 2A).

Figure 4C:
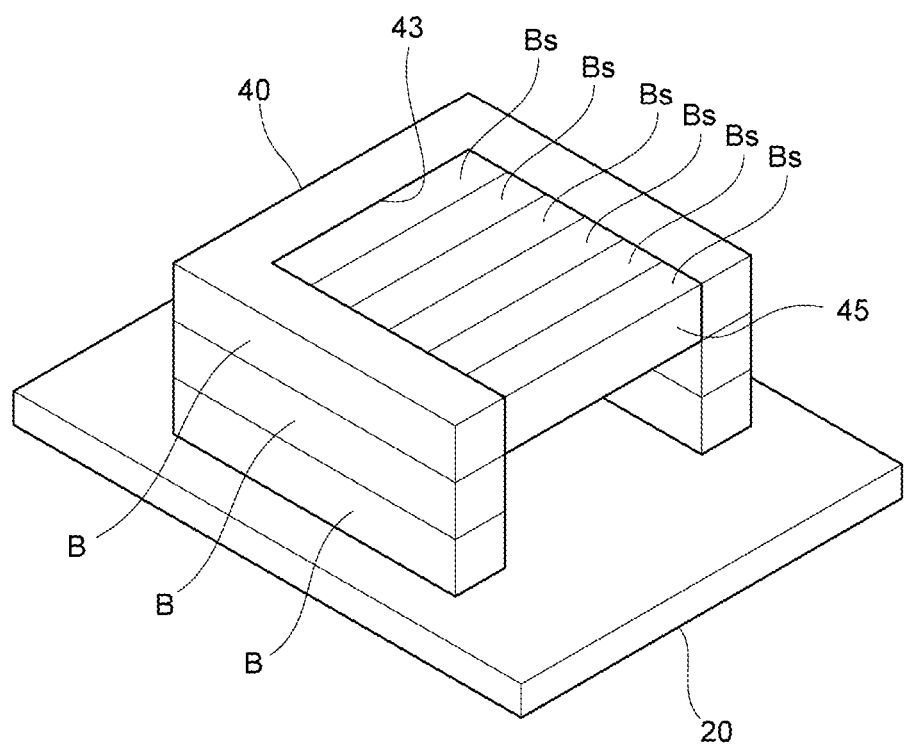
FIG. 4C is a perspective view of the additively-manufactured object being manufactured, which shows the example of the procedure for manufacturing the additively-manufactured object.

Then, a plurality of support beads Bs are sequentially deposited on the side of this support bead Bs. At this time, the support bead Bs is formed such that the ratio of the height H to the width W is also 0.35 or more (H/W≥0.35). Accordingly, as shown in FIG. 4C, a support layer 45 in which a plurality of support beads Bs are deposited is formed from the base portion 43 toward the side (support layer building step). At this time, start edges and end edges of the support beads Bs are connected to inner sides of the wall portion 40 facing each other.

Figure 4D:
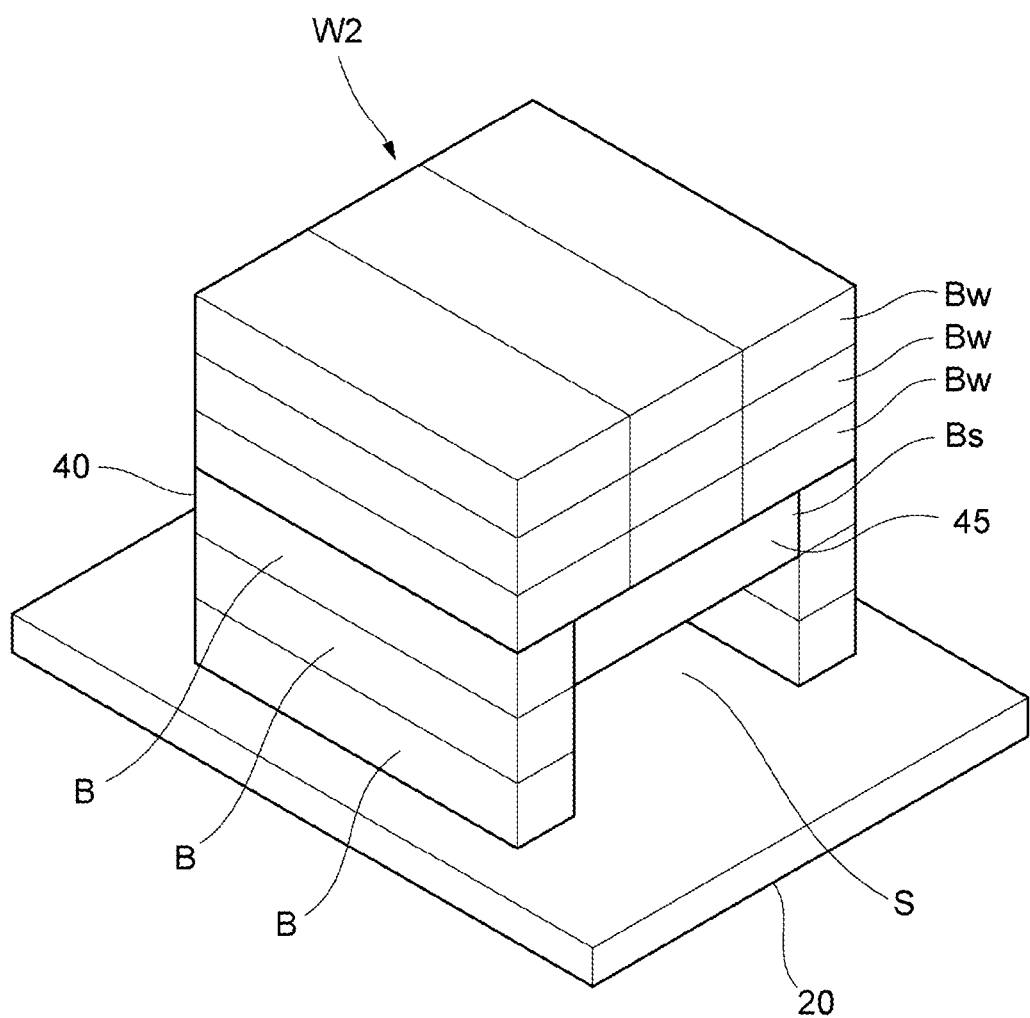
FIG. 4D is a perspective view of the additively-manufactured object being manufactured, which shows the example of the procedure for manufacturing the additively-manufactured object.

Thereafter, as shown in FIG. 4D, a weld bead Bw wider than the support beads B is formed and deposited on the wall portion 40 formed by the weld bead B and the support layer 45 formed by the support bead Bs along a direction orthogonal to the forming direction of the support beads Bs (depositing step). When forming this wide weld bead Bw, weaving may be performed to displace the torch 17 in a direction intersecting the forming direction of the weld bead Bw.

An additively-manufactured object W2 formed in this way has a cavity portion S in which the support layer 45 is a ceiling wall, and this cavity portion S can be applied to a flow path, for example.

When forming the support layer 45, since the start edges and the end edges of the support beads Bs are connected to inner surfaces of the wall portion 40 facing each other, dripping of the support beads Bs can be further prevented. In addition, since the support beads Bs are deposited on the inner sides of the wall portion 40 to form a support layer, the length of each support bead Bs can be shortened, and the amount of dripping per support bead Bs can be prevented. Here, the support bead Bs is formed in the horizontal direction, but the support bead Bs is not necessarily formed horizontally, and may be formed to be inclined from the vertical direction. Accordingly, the additively-manufactured object W1 having an overhang-shaped portion protruding to the side can be manufactured with high quality while reducing a takt time.

Next, another example of manufacturing the additively-manufactured object will be described.

Figure 5:
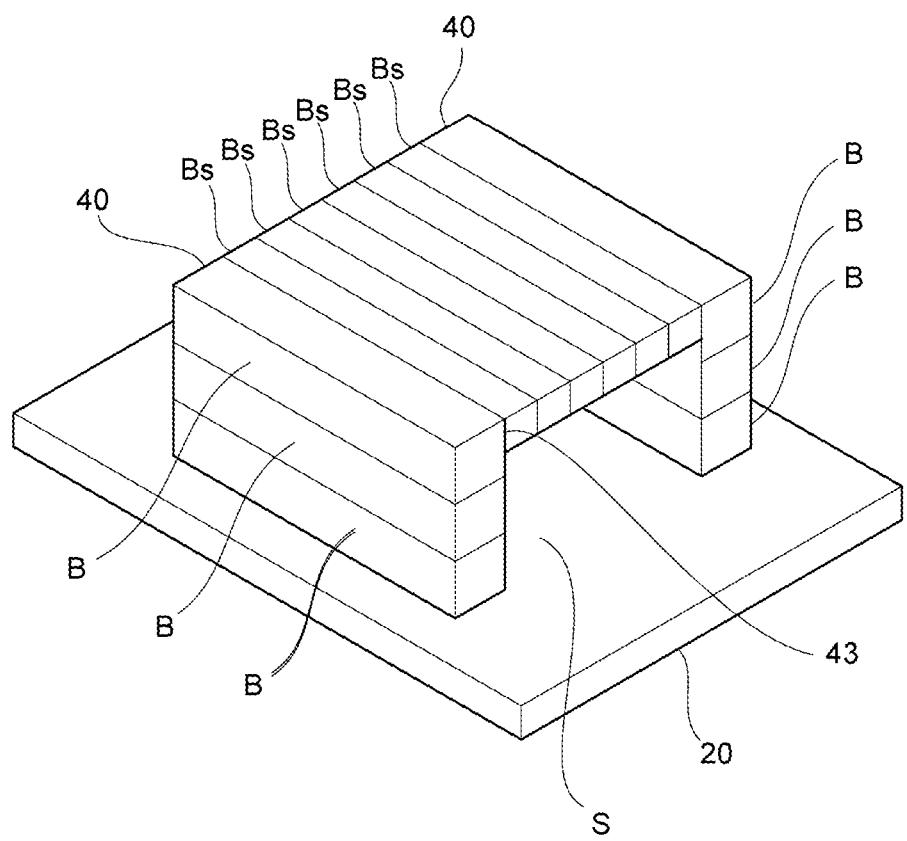
FIG. 5 is a perspective view of the additively-manufactured object being manufactured, which shows another example of the procedure for manufacturing the additively-manufactured object.

FIG. 5 is a perspective view of the additively-manufactured object being manufactured, which shows another example of the procedure for manufacturing the additively-manufactured object.

As shown in FIG. 5, first, the weld bead B is deposited on the plate-shaped base metal 20, and a plurality of independent wall portions (outer frame portions) 40 are formed. These wall portions 40 are not limited to a case of being vertically installed, and may be inclined to be close to each other toward the upper side, which is the deposition direction of the weld bead B.

Next, a part of an inner surface side of one wall portion 40 is used as the base portion 43, and the support bead Bs is formed on the upper edge portion of the base portion 43 (support bead forming step). At this time, the support bead Bs to be formed is formed such that the ratio of the height H to the width W is 0.35 or more (H/W≥0.35) (see FIG. 2A).

Then, a plurality of support beads Bs are sequentially deposited on the side of this support bead Bs. At this time, each of the support beads Bs is formed such that the ratio of the height H to the width W is also 0.35 or more (H/W≥0.35). Accordingly, the support layer 45 in which a plurality of support beads Bs are deposited is formed from the base portion 43 toward the side (support layer building step). Then, the support bead Bs is deposited such that the support layer 45 is connected to the upper edge portion on the inner surface side of the other wall portion 40.

At this time, since the start edges and the end edges of the support beads Bs are not limited, each support bead Bs can be formed long. Accordingly, when the support bead Bs is deposited to form the support layer 45, the number of passes of the support bead Bs can be reduced for efficient building.

When building the support layer 45, a part of the inner surface sides of the wall portions 40 facing each other may be used as base portions 43, and the support layer 45 may be deposited on and connected at an intermediate position of these base portions 43.

Thereafter, a weld bead Bw wider than the support beads B is formed and deposited on the wall portion 40 formed by the weld bead B and the support layer 45 formed by the support bead Bs along a direction orthogonal to the forming direction of the support beads Bs or along the forming direction (depositing step). In this case, when forming the wide weld bead Bw, weaving may also be performed to displace the torch 17 in a direction intersecting the forming direction of the weld bead Bw.

The additively-manufactured object W2 formed in this way has the cavity portion S in which the support layer 45 is a ceiling wall and both edges are open, and this cavity portion S can be applied to a flow path, for example.

EXAMPLES

Weld beads B having different heights and widths (height/width) were deposited on the base portion 13 of the base plate 10 having a vertical surface while changing welding conditions (voltage, heat input), and the shape was evaluated. The weld bead B was deposited 5 times in Test Examples 1 to 5.

Welding Conditions and Evaluation Results

Table 1 shows the welding conditions, the shape of the weld bead, and the evaluation results.

TABLE 1

|  | Voltage (V) | Heat input (J/mm) | Bead width (mm) | Bead height (mm) | Height/width | Welding cross-sectional area (mm$^2$) | Shape evaluation |
| --- | --- | --- | --- | --- | --- | --- | --- |
| Test Example 1 | 11.8 | 474 | 5.76 | 3.52 | 0.61 | 14.41 | ○ |
| Test Example 2 | 13.7 | 390 | 6.65 | 2.91 | 0.44 | 11.64 | ○ |
| Test Example 3 | 13.7 | 260 | 5.30 | 2.33 | 0.44 | 7.76 | ○ |
| Test Example 4 | 16.1 | 547 | 9.94 | 2.91 | 0.29 | 19.21 | x |
| Test Example 5 | 16.1 | 274 | 7.50 | 2.07 | 0.28 | 9.61 | x |

Figure 6A:
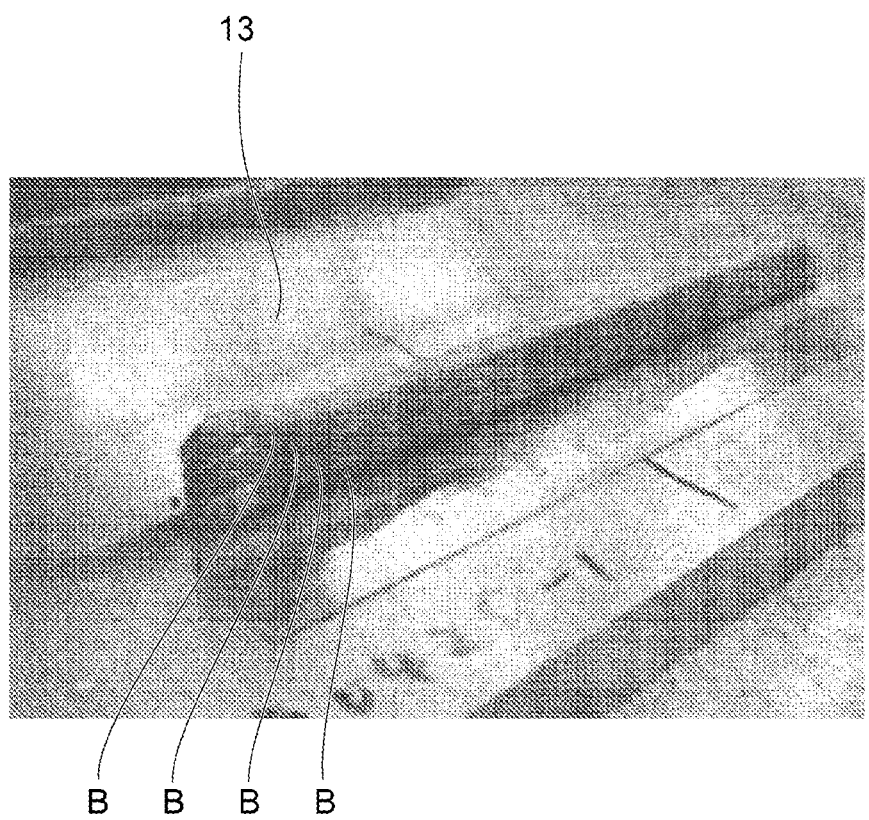
FIG. 6A is a perspective view showing a formation state of a weld bead in Test Example 1.

All of Test Example 1 (height/width=0.61) and Test Examples 2 and 3 (height/width=0.44) were evaluated to be passed (evaluation ○ in Table 1). FIG. 6A is a diagram showing a formation state of the weld bead B in Test Example 1. As shown in FIG. 6A, the weld bead B was formed without dripping with respect to the base portion 13, and was uniformly deposited in the horizontal direction.

Figure 6B:
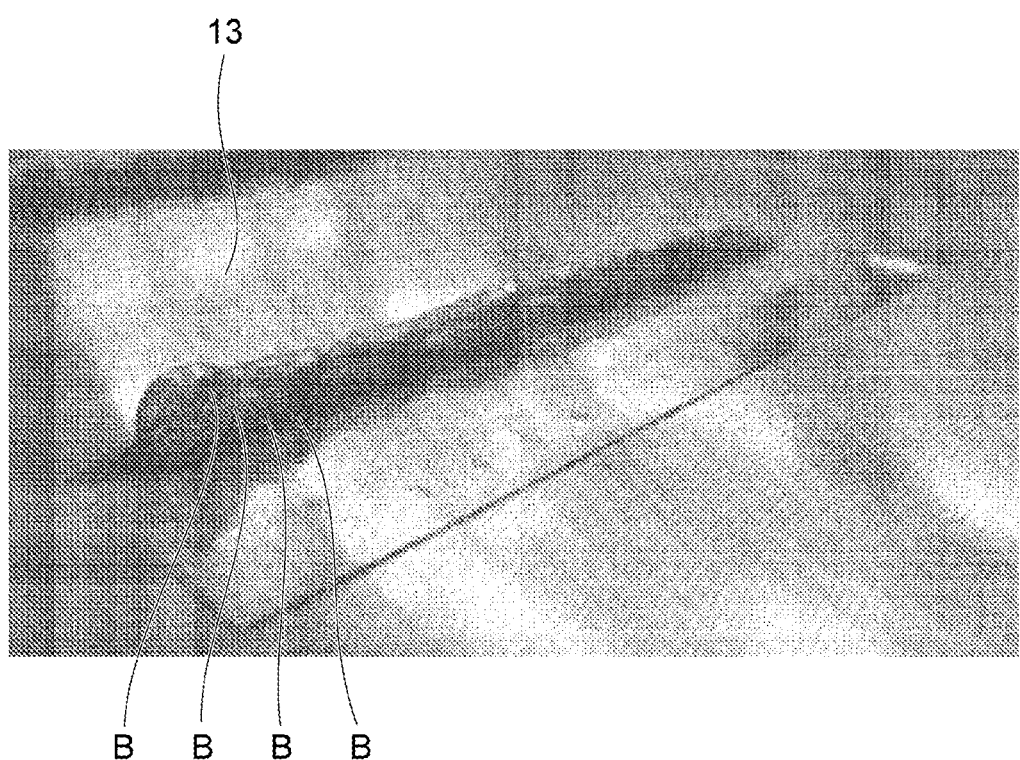
FIG. 6B is a perspective view showing a formation state of a weld bead in Test Example 5.

In contrast, both Test Example 4 (height/width=0.29) and Test Example 5 (height/width=0.28) were evaluated to be failed (evaluation x in Table 1). FIG. 6B is a diagram showing a formation state of the weld bead B in Test Example 5. As shown in FIG. 6B, the weld bead B had dripping from the base portion 13, and had a non-uniform formation state in the horizontal direction.

Figure 7:
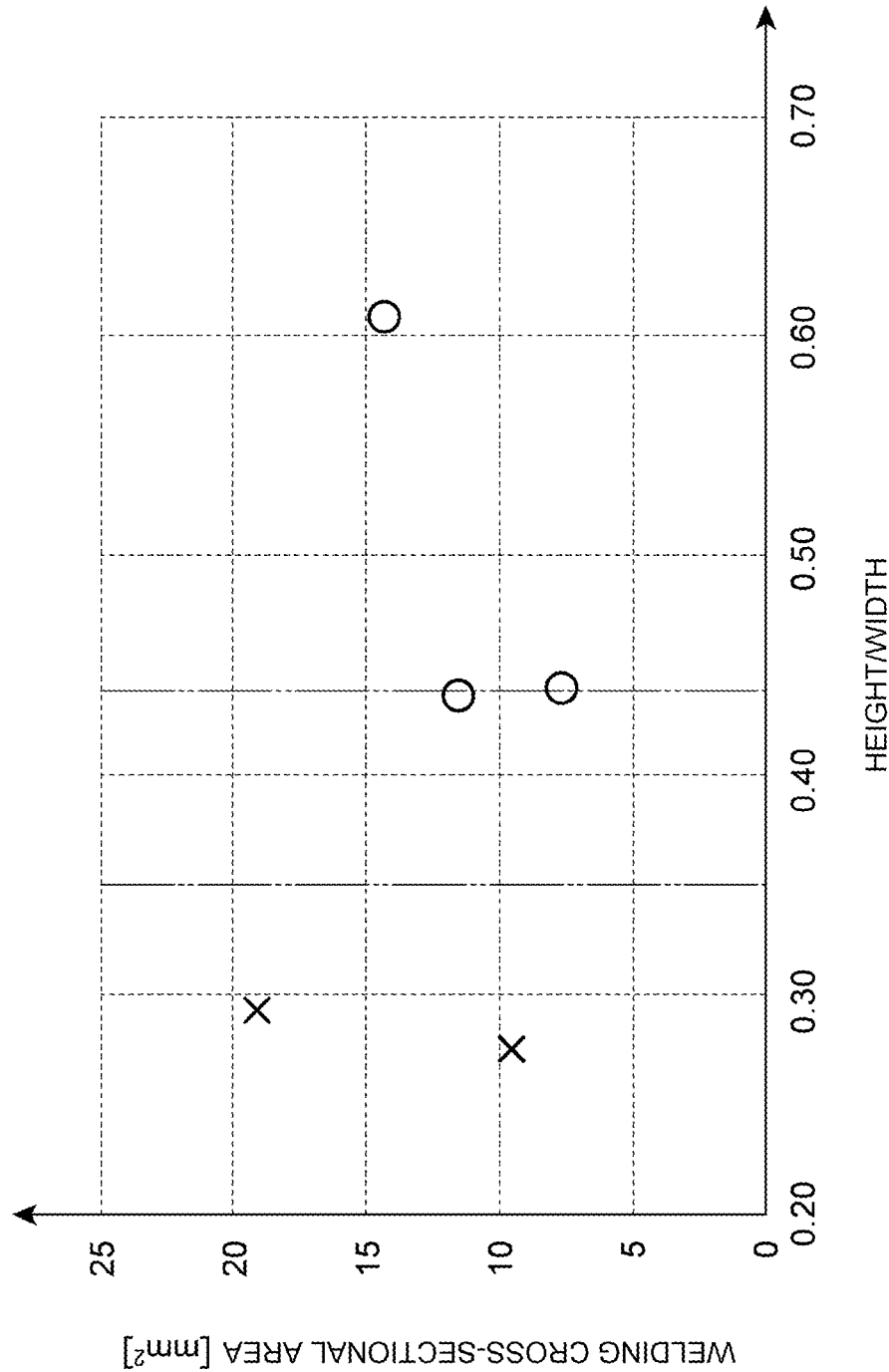
FIG. 7 is a graph showing a relationship of a welding cross-sectional area with respect to a ratio of a height to a width of the weld bead.

FIG. 7 shows a relationship of a welding cross-sectional area with respect to the ratio of the height to the width of the formed weld bead B. As see from FIG. 7, when the ratio of the height to the width (height/width) is 0.35 or more, regardless of the welding cross-sectional area, the weld bead B can be formed uniformly in the horizontal direction without any problems such as dripping, and particularly, the ratio of the height to the width (height/width) is preferably 0.44 or more. That is, when the ratio of the height to the width (height/width) of the weld bead B is 0.35 or more, the weld bead B can be suitably used as the support bead Bs when forming an additively-manufactured object from the base portion 13 to the side.

The present invention is not limited to the above embodiments, and combinations of the respective configurations of the embodiments, or changes and applications made by those skilled in the art based on the description of the specification and the well-known technology are also intended by the present invention and are included within the scope to be protected.

As described above, the present description discloses the following matters.

(1) A method for manufacturing an additively-manufactured object, in which a plurality of weld beads obtained by melting and solidifying a filler metal are deposited on a base portion to build a built-up object, the method including:

a support bead forming step of forming a support bead on the base portion; and a depositing step of depositing a weld bead on the support bead, in which, when the support bead is formed to be inclined from a vertical direction in the support bead forming step, a ratio H/W of a height H to a width W of the support bead is set to 0.35 or more.

According to the method for manufacturing an additively-manufactured object having the configuration described in the above (1), the support bead is formed on the base portion, and the weld bead is deposited on this support bead to build a built-up object. When forming the support bead on the base portion, the ratio of the height to the width of the support bead is set to 0.35 or more. Accordingly, the support bead can be formed without dripping with respect to the base portion while preventing the influence of the gravity. Therefore, the weld bead deposited on this support bead can be prevented from dripping under the influence of the gravity, and the occurrence of humping that may occur when increasing the moving speed of the torch to prevent dripping can be prevented. Accordingly, an additively-manufactured object having an overhang-shaped portion protruding from the base portion to the side can be manufactured with high quality while reducing a takt time.

(2) The method for manufacturing an additively-manufactured object according to (1), further including:

a support layer building step of building a support layer by depositing the support bead to be connected in one direction, in which in the depositing step, a weld bead wider than the support bead is formed on the support layer.

According to the method for manufacturing an additively-manufactured object having the configuration described in the above (2), the support bead is deposited to be connected in one direction to form the support layer, and a wide weld bead is formed on the upper portion of the support layer to build an additively-manufactured object. That is, the support layer is built by the support bead formed without dripping, and the weld bead wider than the support bead is deposited on the support layer. Therefore, the wide weld bead to be formed on the support layer can be smoothly formed and deposited without dripping due to the influence of the gravity. Accordingly, the wide weld bead can be formed to reduce the formation pass after building the support layer, and the manufacturing efficiency can be improved.

(3) The method for manufacturing an additively-manufactured object according to (2), in which the support layer built in the support layer building step is used as a wall portion forming a cavity portion.

According to the method for manufacturing an additively-manufactured object having the configuration described in the above (3), the support layer formed by depositing the support bead to be connected in one direction is formed without dripping. Therefore, for example, by forming a part of a wall such as a ceiling of a cavity portion that serves as a flow path or the like, an additively-manufactured object having a cavity portion having a stable shape can be obtained.

(4) The method for manufacturing an additively-manufactured object according to (2) or (3), further including:

a step of forming an outer frame portion that is bent or curved by depositing a weld bead while changing a stretching direction, in which a start edge and an end edge of the support bead are set with respect to the outer frame portion, and the support bead is deposited on an inner side of the outer frame portion to form the support layer.

According to the method for manufacturing an additively-manufactured object having the configuration described in the above (4), the start edge and the end edge of the support bead are connected to the outer frame portion, so that dripping of the support bead can be further prevented. In addition, since the support beads are deposited on the inner sides of the outer frame portion to form a support layer, the length of each support bead can be shortened, and the amount of dripping per support bead can be prevented.

(5) The method for manufacturing an additively-manufactured object according to (2) or (3), further including:

a step of depositing a weld bead to form a plurality of independent outer frame portions, in which the support layer is formed to connect the plurality of outer frame portions.

According to the method for manufacturing an additively-manufactured object having the configuration described in the above (5), the start edges and the end edges of the support beads are not limited, so that each support bead can be formed long. Accordingly, when the support bead is deposited to form the support layer, the number of passes of the support bead can be reduced for efficient building.

(6) An additively-manufactured object formed by depositing, on a base portion, a plurality of weld beads obtained by melting and solidifying a filler metal, the additively-manufactured object including:

a support bead formed on the base portion; and a weld bead deposited on the support bead, in which the support bead has a ratio H/W of a height H to a width W of an overhang-shaped portion having an overhang of 0.35 or more.

According to the additively-manufactured object having the configuration described in the above (6), the support bead is formed on the base portion, and the weld bead is deposited on the support bead. The support bead formed to protrude from the base portion to the side has a ratio of the height to the width of 0.35 or more. Accordingly, when building an additively-manufactured object, the support bead can be formed without dripping with respect to the base portion while preventing the influence of the gravity. In addition, the weld bead deposited on the support bead can be prevented from dripping under the influence of the gravity, and the occurrence of humping that may occur when increasing the moving speed of the torch to prevent dripping can be prevented. Accordingly, a high-quality additively-manufactured object having an overhang shape while preventing the takt time can be built.

(7) The additively-manufactured object according to (4), further including:

a support layer in which the support bead is deposited to be connected in one direction, in which a weld bead wider than the support bead is formed on the support layer.

According to the additively-manufactured object having the configuration described in the above (7), the wide weld bead is formed on the upper portion of the support layer in which the support bead is deposited to be connected in one direction. That is, the support layer is built by the support bead formed without dripping, and the weld bead wider than the support bead is deposited on the support layer. Therefore, the wide weld bead can be smoothly formed and deposited on the support layer without dripping due to the influence of the gravity. Accordingly, the wide weld bead can be formed to reduce the formation pass after building the support layer, and the manufacturing efficiency can be improved.

(8) The additively-manufactured object according to (5), in which the support layer is used as a wall portion forming a cavity portion.

According to the additively-manufactured object having the configuration described in the above (8), the support layer in which the support bead is deposited to be connected in one direction is formed without dripping. Therefore, for example, by forming a part of a wall such as a ceiling of a cavity portion that serves as a flow path or the like, an additively-manufactured object having a cavity portion having a stable shape can be obtained.

(9) The additively-manufactured object according to (7) or (8), further including:

an outer frame portion that is curved and formed by depositing a weld bead while changing a stretching direction, in which the support layer is formed on an inner side of the outer frame portion, the support layer being formed by depositing the support bead both edges of which are connected to an inner surface of the outer frame portion.

According to the additively-manufactured object having the configuration described in the above (9), both edges of the support bead are connected to the outer frame portion, so that an additively-manufactured object in which the dripping of the support bead is further prevented can be obtained. In addition, because of a structure in which the support bead is connected to the inner side of the outer frame portion to form the support layer, during the manufacturing, the length of each support bead can be shortened, and the amount of dripping per support bead can be prevented.

(10) The additively-manufactured object according to (7) or (8), further including:

a plurality of independent outer frame portions formed by depositing a weld bead, in which the support layer is formed to connect the plurality of outer frame portions.

According to the additively-manufactured object having the configuration described in the above (10), the start edges and the end edges of the support beads are not limited, so that an additively-manufactured object with a long length of each support bead can be obtained. Accordingly, when the support bead is deposited to form the support layer, the number of passes of the support bead can be reduced for efficient building.

The present application is based on a Japanese patent application (Japanese Patent Application No. 2019-91596) filed on May 14, 2019, contents of which are incorporated herein by reference.

REFERENCE SIGNS LIST 13, 43 base portion
15, 45 support layer
40 wall portion (outer frame portion)
B, Bw weld bead
Bs support bead
H height of support bead
M filler metal
S cavity portion
W width of support bead
W1, W2 additively-manufactured object

The invention claimed is:

1. A method for manufacturing an additively-manufactured object, in which a plurality of linear weld beads obtained by melting and solidifying a weld wire with an arc are deposited on a base portion to build a built-up object, the method comprising:

a support layer building step of forming a first support bead on the base portion having a vertical surface or a surface inclined from a deposition direction of the plurality of linear weld beads and building a support layer by depositing a plurality of second support beads in one direction on a side of the first support bead; and a depositing step of depositing a weld bead wider than the first support bead on the support layer along a direction orthogonal to a depositing direction of the plurality of second support beads, wherein, when the first support bead is formed to be inclined from a vertical direction in the support layer building step, a ratio H/W of a height H to a width W of the first support bead is set to 0.35 or more, the additively-manufactured object includes a wall portion having inner wall surfaces facing each other, the support layer is built by connecting a start edge and an end edge of the support layer to the inner wall surfaces facing each other, and the wall portion and the support layer forming a ceiling wall form a cavity portion.

2. The method for manufacturing an additively-manufactured object according to claim 1, further comprising:

a step of depositing a weld bead to form a plurality of independent outer frame portions, wherein the support layer is formed to connect the inner wall surfaces of the wall portion to each other.

* * * * *